United States Patent
Kato et al.

(10) Patent No.: US 6,778,889 B2
(45) Date of Patent: Aug. 17, 2004

(54) STEER-BY-WIRE STEERING DEVICE CAPABLE OF ENHANCING STEERING PERFORMANCE AND RELIABILITY

(75) Inventors: Hironori Kato, Miyagi-ken (JP); Yoshio Sanpei, Miyagi-ken (JP); Noriyuki Fukushima, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/185,913

(22) Filed: Jun. 28, 2002

(65) Prior Publication Data

US 2003/0009272 A1 Jan. 9, 2003

(30) Foreign Application Priority Data

Jul. 3, 2001 (JP) ....................... 2001-202377

(51) Int. Cl.[7] .............................................. G05B 13/02
(52) U.S. Cl. ..................... 701/41; 701/42; 180/402
(58) Field of Search ................ 701/41, 42; 180/402, 180/444, 446, 443

(56) References Cited

U.S. PATENT DOCUMENTS

| | | | |
|---|---|---|---|
| 4,224,615 A | 9/1980 | Penz | .......................... 345/174 |
| 4,499,343 A | 2/1985 | Prioux et al. | ................. 200/5 A |
| 5,261,503 A | 11/1993 | Yasui | |
| 6,204,839 B1 | 3/2001 | Mato, Jr. | ..................... 345/168 |
| 6,213,248 B1 | 4/2001 | Kawaguchi et al. | |
| 6,219,604 B1 | 4/2001 | Dilger et al. | .................. 701/41 |
| 6,259,044 B1 | 7/2001 | Partatore et al. | ............ 200/5 A |
| 6,598,695 B1 * | 7/2003 | Menjak et al. | ............... 180/402 |
| 2003/0055546 A1 * | 3/2003 | Demerly et al. | ............... 701/42 |

FOREIGN PATENT DOCUMENTS

| | | |
|---|---|---|
| DE | 42 32 256 | 4/1993 |
| EP | 0 421 025 | 10/1989 |
| EP | 0 556 999 | 2/1993 |
| EP | 0 609 021 | 1/1994 |
| EP | 0 262 469 | 4/1998 |
| GB | 2 322 008 | 8/1998 |
| JP | 07149251 | 6/1995 |
| JP | 08119135 | 5/1996 |

* cited by examiner

*Primary Examiner*—Marthe Y. Marc-Coleman
(74) *Attorney, Agent, or Firm*—Brinks Hofer Gilson & Lione

(57) ABSTRACT

The steer-by-wire steering device includes a steering wheel, an operating angle sensor which detects an operation angle of the steering wheel, an operating element actuator which applies an external force for force feedback to the steering wheel, a tire reactive force sensor, a steering actuator which applies an external force to a vehicle's steering system, and a controller which receives output signals of the operating angle sensor and the tire reactive force sensor and controls driving of the operating element actuator and the steering actuator. A plurality of functions $F_1=f(b)$, $F_2=f(b)$, $F_3=f(b)$ which use a detection signal b inputted from the tire reactive force sensor as a parameter are preliminarily stored in the controller. Then, an optimum function is selected from the plurality of preliminarily stored functions in response to a level of the detection signal b. Thereafter, a drive signal c for the operating element actuator is computed based on the selected function and the level of the inputted detection signal and then is outputted.

6 Claims, 7 Drawing Sheets

STEER-BY-WIRE STEERING DEVICE CAPABLE OF ENHANCING STEERING PERFORMANCE AND RELIABILITY

BACKGROUND OF THE INVENTION

1. Field of the Invention

The present invention relates to a steer-by-wire steering device which is mounted in a vehicle, and more particularly to a control means for an actuator which applies an external force for force feedback to a steering operation element such as a steering wheel.

2. Description of the Related Art

One example of a steer-by-wire steering device which has been proposed conventionally is explained hereinafter in conjunction with FIG. 9 and FIG. 10. FIG. 9 is a view showing the constitution of the steer-by-wire steering device which has been proposed conventionally and FIG. 10 is a graph showing the relationship between an external force applied to a tire and an external force acting on a steering operation element.

As shown in FIG. 9, the steer-by-wire steering device of this example includes a steering wheel 21 which constitutes a steering operation element, an operating angle sensor 22 which detects an operation angle of the steering wheel 21, an operating element actuator 23 which applies an external force for force feedback to the steering wheel 21, a tire reactive force sensor 24 which constitutes a detection means for detecting a travelling condition of a vehicle, a steering actuator 25 which applies an external force to a steering system of the vehicle, and a controller 26 which receives output signals of the operating angle sensor 22 and the tire reactive force sensor 24 and controls the driving of the operating element actuator 23 and the steering actuator 25.

In a mechanical steering device, a tire and a steering wheel are connected to each other by way of a mechanical link mechanism and an external force which is applied to the tire from a road surface during travelling is directly transmitted to the steering wheel. Accordingly, the external force applied to the tire and the external force applied to the steering wheel exhibit the proportional relationship as shown in FIG. 10.

In the conventional steer-by-wire steering device, to obtain an operation feeling similar to that of the mechanical steering device, the controller 26 controls the driving of the operating element actuator 23 in response to signals inputted from the tire reactive force sensor 24 so as to apply the external force which is proportional to the external force applied to the tire to the steering wheel.

With the provision of the above-mentioned conventional steer-by-wire steering device, the operation feeling similar to that of the mechanical steering device can be obtained.

However, since this steer-by-wire steering device adopts the constitution in which the external force which is proportional to the external force applied to the tire is applied to the steering wheel 21, when a sudden and large external force acts on the tire, for example, when the tire gets over a shoulder of a road or when the vehicle enters an unpaved road or a dirt road from a paved road or when the vehicle receives a cross wind at an exit of a tunnel, a large external force acts on the steering wheel 21 so it is feared that the travelling of the vehicle becomes unstable. Such a drawback is particularly apparent when the vehicle speed is high, a torque which acts on a drive shaft of the vehicle is high, when the operation acceleration of the steering wheel is high, when a gripping force of the tire is lowered due to a low ambient temperature, and when a surface of road is wet so that a gripping force of the tire is lowered or the like.

Further, in the above-mentioned conventional steer-by-wire steering device, when the external force which acts on the tire is small, the external force which acts on the steering wheel 21 is made small proportionally. For example, when the external force acts on the tire is extremely small as in a case in which a vehicle performs straight travelling at a high speed on an express way, the external force applied to the steering wheel 21 by the operating element actuator 23 also becomes extremely small so that even when a driver applies an extremely small operation force to the steering wheel 21, there may arise a drawback that the vehicle largely staggers or meanders

SUMMARY OF THE INVENTION

The present invention has been made to solve these drawbacks of the prior art and it is an object of the present invention to provide a steer-by-wire steering device which is capable of applying an optimum external force to a steering operation element in response to a travelling condition of a vehicle or a condition of a road surface.

To solve the above-mentioned drawbacks, according to the present invention, there is provided a steer-by-wire steering device comprising a steering operation element, an actuator which applies an external force to the steering operation element, a controller of the actuator, and detection means for detecting a travelling condition of a vehicle including at least a tire reactive force sensor which detects an external force applied to a tire of a vehicle from a road surface, wherein the controller stores a plurality of functions which use a detection signal inputted from the detection means as a parameter therein, the controller selects an optimum function from the plurality of functions in response to a level of the detection signal inputted from the detection means, and the controller computes a control signal for the actuator based on the selected function and a level of the detection signal and outputs the control signal.

In the above-mentioned steer-by-wire steering device, as the detection means, in addition to the tire reactive force sensor, the steering device is further provided with at least one type of sensor selected from a group of sensors including a vehicle speed sensor which detects a travelling speed of the vehicle, a torque sensor which detects torque acting on a drive shaft of the vehicle, an acceleration sensor which detects operation acceleration of the steering operation element, a temperature sensor which detects an ambient temperature, and an image pick-up sensor which detects a road surface condition.

In the above-mentioned steer-by-wire steering device, the function which is selected when the level of the detection signal is equal to or below a first prescribed value is a function which sets the external force applied to the steering operation element to an external force smaller than an external force proportional to the level of the detection signal, the function which is selected when the level of the detection signal is equal to or above a second prescribed value is a function which sets the external force applied to the steering operation element to an external force larger than an external force proportional to the level of the detection signal, and the function which is selected when the level of the detection signal is equal to or below the first prescribed value and is equal to or above the second prescribed value is a function which sets the external force applied to the steering operation element to an external force proportional to the level of the detection signal.

In the above-mentioned steer-by-wire steering device, the function which is selected when the level of the detection signal is equal to or below a first prescribed value is a function which sets the external force applied to the steering operation element to an external force larger than an external force proportional to the level of the detection signal, the function which is selected when the level of the detection signal is equal to or above a second prescribed value is a function which sets the external force applied to the steering operation element to an external force smaller than an external force proportional to the level of the detection signal, and the function which is selected when the level of the detection signal is equal to or below the first prescribed value and is equal to or above the second prescribed value is a function which sets the external force applied to the steering operation element to an external force proportional to the level of the detection signal.

In the above-mentioned steer-by-wire steering device, provided that the image pick-up sensor which detects the road surface condition is provided as the detection means, the function which is selected by the image pick-up sensor when the road surface is wet is a function which sets the external force applied to the steering operation element to an external force larger than an external force proportional to the level of the detection signal, and the function which is selected by the image pick-up sensor when the road surface is dry is a function which sets the external force applied to the steering operation element to an external force smaller than the external force proportional to the level of the detection signal.

In the above-mentioned steer-by-wire steering device, provided that the acceleration sensor which detects operation acceleration of the steering operation element is provided as the detection means, the function which is selected when operation acceleration detected by the acceleration sensor is equal to or more than prescribed acceleration is a function which sets the external force applied to the steering operation element to an external force smaller than an external force proportional to the level of the detection signal.

In this manner, the controller preliminarily stores a plurality of functions which use a detection signal inputted by detection means as a parameter therein. Then, the controller selects an optimum function from the plurality of functions which are preliminarily stored in response to the level of the detection signal inputted from the detection means. Thereafter, the controller computes the control signal for the actuator based on the selected function and the level of the inputted detection signal and outputs the control signal. As a result, the controller can perform control such that, for example, when a sudden and large external force acts on the tire, the external force applied to the steering operation element is made relatively small, while when the external force which acts on the tire is small, the external force applied to the steering operation element is made relatively large. Accordingly, it is possible to apply an optimum external force which corresponds to the travelling condition of the vehicle and the road surface condition to the steering operation element whereby the operation performance and the reliability of the steer-by-wire steering device can be enhanced.

DETAILED DESCRIPTION OF THE PREFERRED EMBODIMENTS

Figure 1:
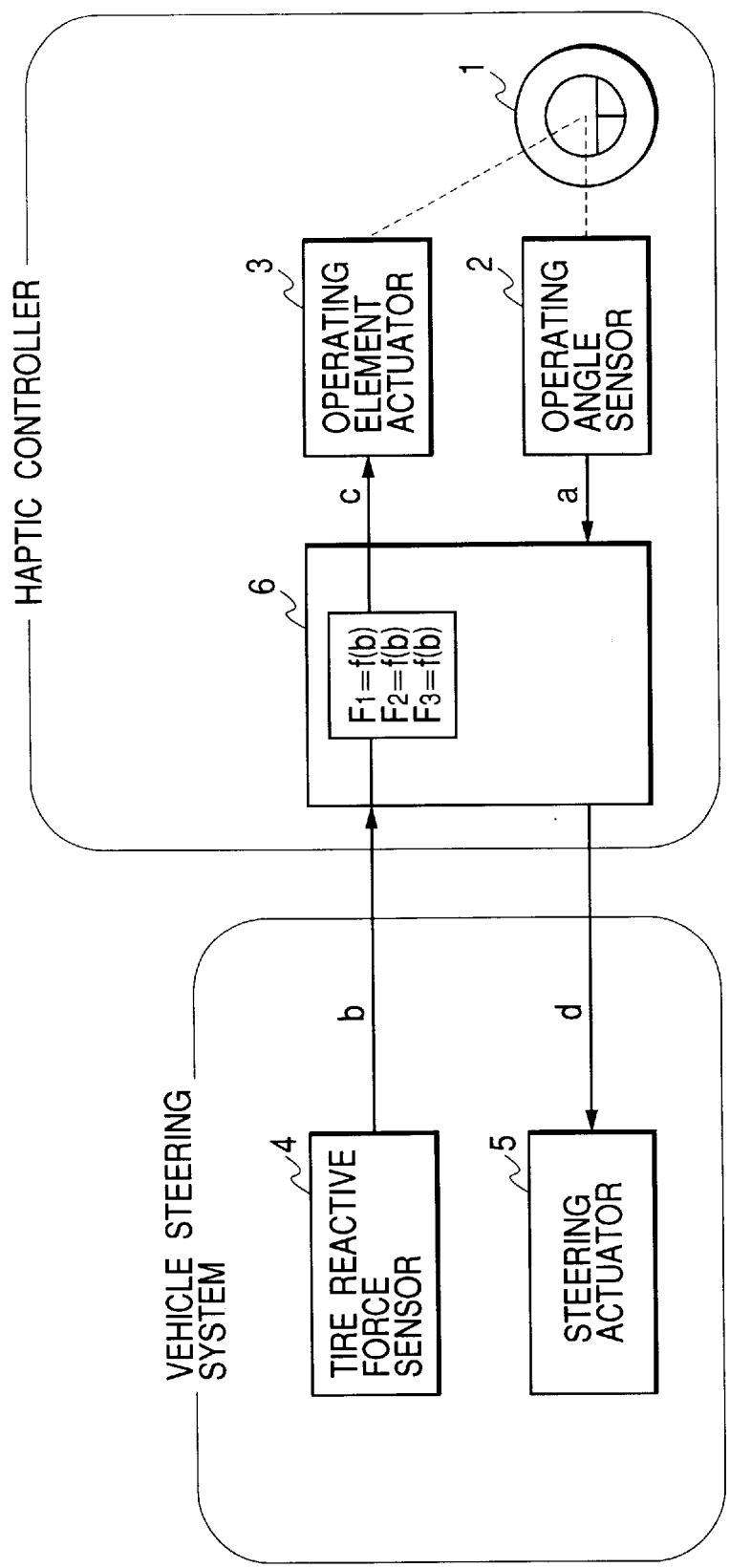
FIG. 1 is a view showing a constitution of a steering device according to a first embodiment.

A first embodiment of a steer-by-wire steering device according to the present invention is explained hereinafter in conjunction with FIG. 1 and FIG. 2. FIG. 1 is a view showing the constitution of the steer-by-wire steering device according to the first embodiment and FIG. 2 is a graph showing the relationship between an external force which acts on a steering operation element of the steering device and an external force which acts on a tire of a vehicle according to the first embodiment.

Figure 9:
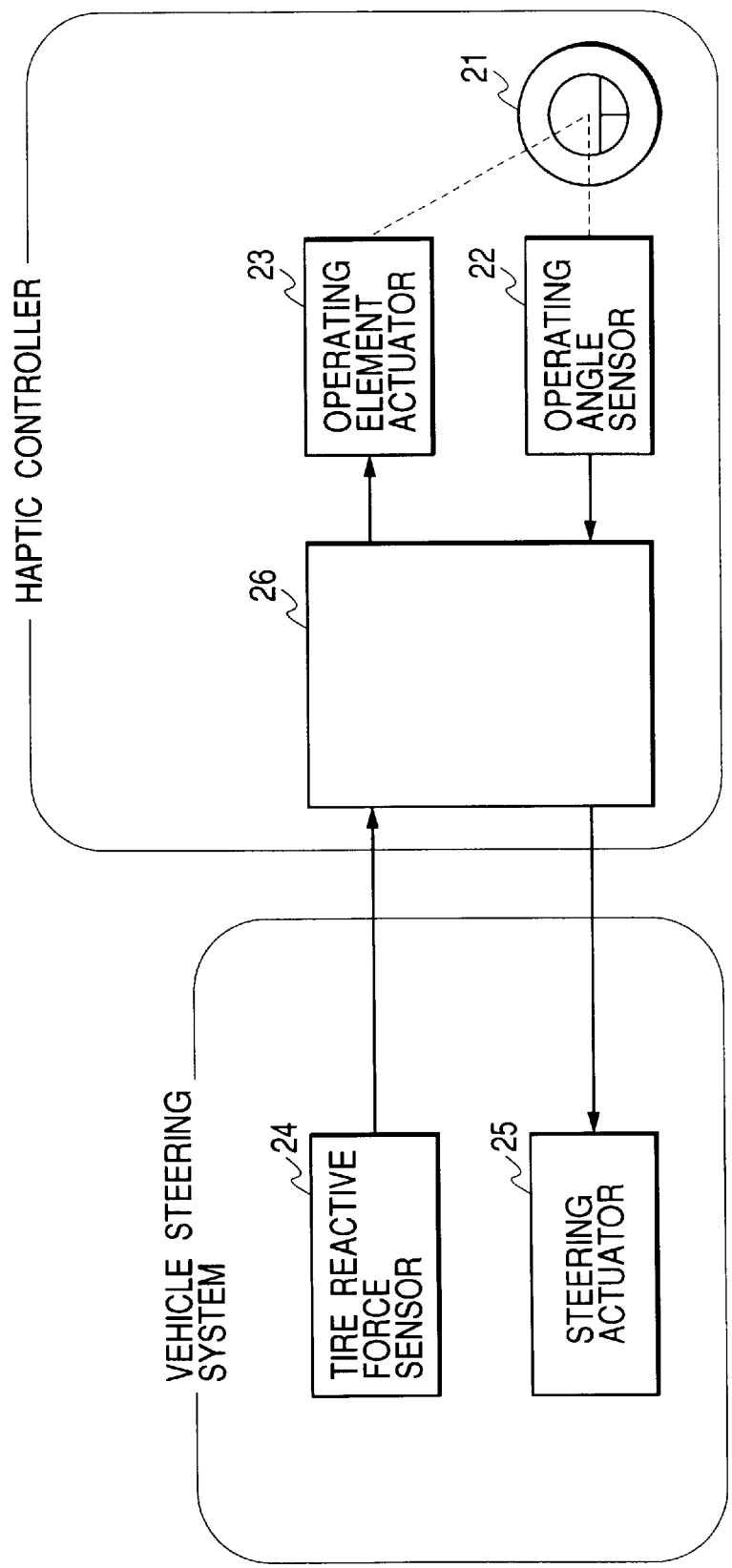
FIG. 9 is a view showing the constitution of a steering device according to a conventional example.
Figure 10:
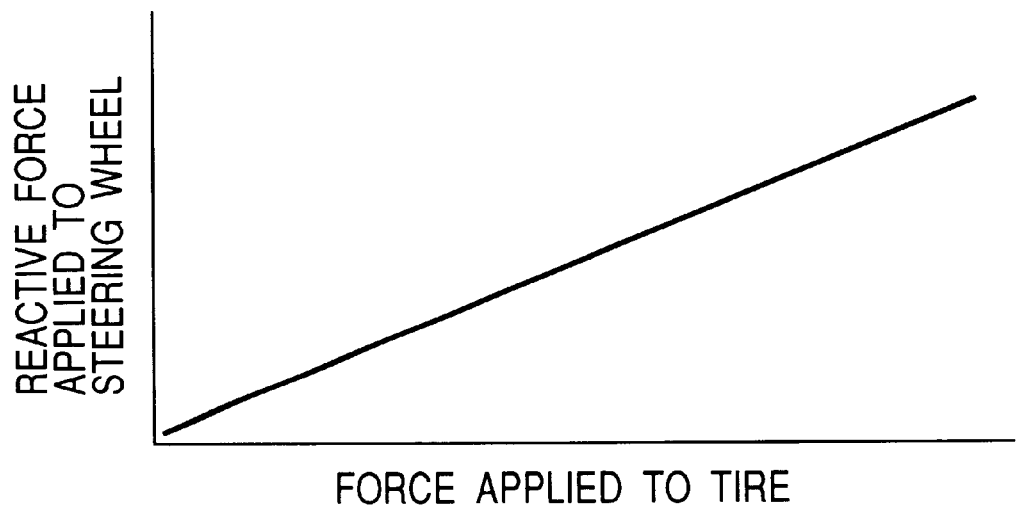
FIG. 10 is a graph showing the relationship between an external force which acts on a steering wheel of the steering device of the conventional example and an external force which acts on a tire of a vehicle.

As shown in FIG. 1, the steer-by-wire steering device of this embodiment substantially has the same basic constitution as that of the conventional steer-by-wire steering device shown in FIG. 9. That is, the steer-by-wire steering device of this embodiment includes a steering wheel 1 which constitutes a steering operation element, an operating angle sensor 2 which detects an operation angle of the steering wheel 1, an operating element actuator 3 which applies an external force for force feedback to the steering wheel 1, a tire reactive force sensor 4 which constitutes a detection means for detecting a travelling condition of a vehicle, a steering actuator 5 which applies an external force to a steering system of the vehicle, and a controller 6 which receives an output signal a of the operating angle sensor 2 and an output signal b of the tire reactive force sensor 4 and outputs a drive signal c for the operating element actuator 3 and a drive signal d for the steering actuator 5.

The steer-by-wire steering device of this embodiment is characterized in that a plurality of functions $F_1=f(b)$, $F_2=f(b)$, $F_3=f(b)$ using the detection signals b inputted from the tire reactive force sensor 4 as parameters are preliminarily stored in the controller 6, and when the detection signal b is inputted from the tire reactive force sensor 4, an optimum function is selected from a plurality of preliminarily stored functions in response to the level of the detection signal b, and the drive signal c of the operating element actuator 3 is computed based on the selected function and the level of the inputted detection signal and thereafter is outputted.

Figure 2:
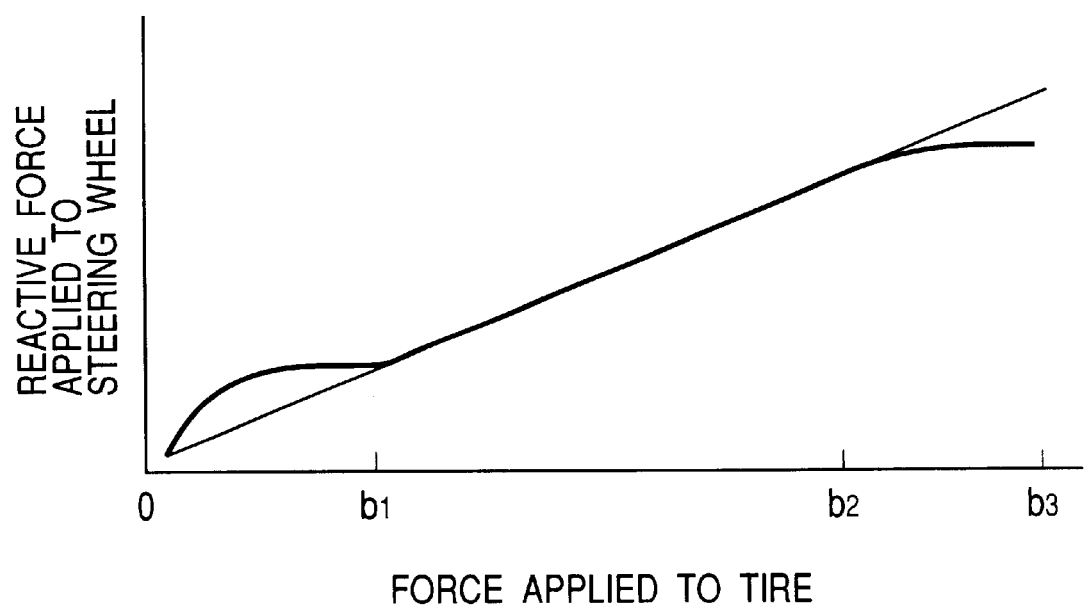
FIG. 2 is a graph showing the relationship between an external force which acts on a steering operation element of the steering device and an external force which acts on a tire of a vehicle according to the first embodiment.

In an example shown in FIG. 2, when the level of the detection signal b assumes $0<b \leq b_1$, the function which applies an external force larger than an external force proportional to an external force applied to the tire to the steering wheel 1 is selected, and when the level of the detection signal b assumes $b_1<b \leq b_2$, the function which applies the external force proportional to the external force applied to the tire to the steering wheel 1 is selected, and when the level of the detection signal b assumes $b_2<b \leq b_3$, the function which applies the external force smaller than the external force proportional to the external force applied to the tire to the steering wheel 1 is selected.

Due to such a control, when the level of the detection signal b detected by the tire reactive force sensor 4 is small, the reinforced external force is applied to the steering wheel 1 by the operating element actuator 3. Accordingly, even when the external force which acts on the tire is extremely small as in a case in which a vehicle performs a linear travelling at high speed on an express way, for example, a proper external force is applied to the steering wheel 1 so that a careless operation of the steering wheel 1 by the driver can be suppressed whereby the staggering or the like of the vehicle can be prevented.

Further, when the level of the detection signal b detected by the tire reactive force sensor 4 is large, the attenuated external force is applied to the steering wheel 1 by the operating element actuator 3. Accordingly, even when the tire gets over a shoulder of a road, when a vehicle enters an unpaved road or a dirt road from a paved road, or when a vehicle receives a cross wind at an exit of a tunnel, it is possible to prevent a phenomenon that the operation of the steering wheel becomes uncontrollable and the travelling of the vehicle becomes unstable.

Further, when the level of the detection signal b detected by the tire reactive force sensor 4 is within a normal range, the external force which is proportional to the external force applied to the tire is applied to the steering wheel 1 by the operating element actuator 3 so that the driver can receive an operation feeling which is similar to that of a mechanical steering device.

Figure 3:
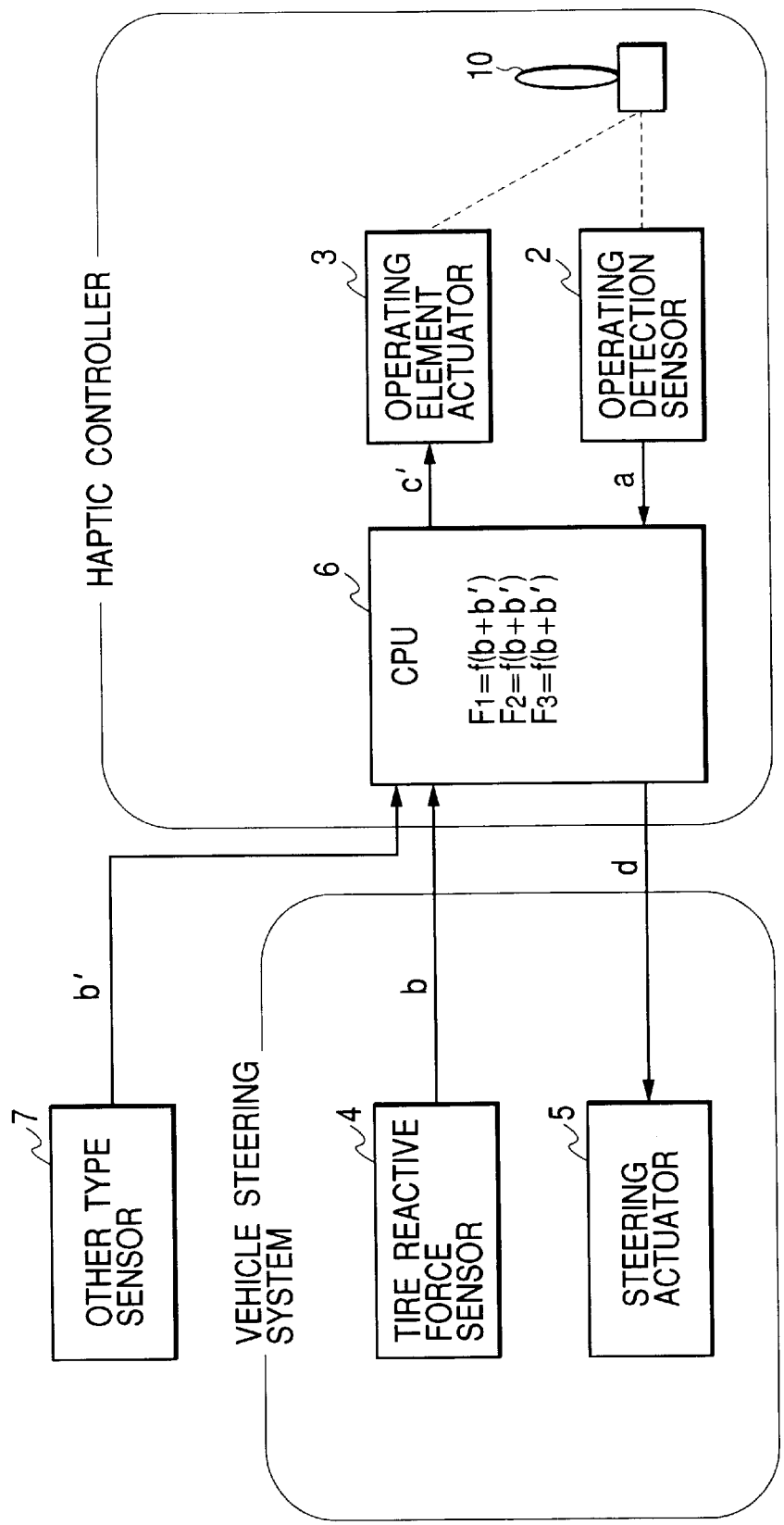
FIG. 3 is a view showing the constitution of a steering device according to a second embodiment.

Although the steering wheel 1 is provided as the steering operation element in this embodiment, the gist of the present invention is not limited to such a constitution and, as shown in FIG. 3, a steering lever 10 may be provided as the steering operation element in place of the steering wheel 1.

Subsequently, a second embodiment of the steer-by-wire steering device is explained in conjunction with FIG. 3 to FIG. 8. FIG. 3 is a view showing the constitution of the steer-by-wire steering device according to the second embodiment. The steering device of the second embodiment differs from the steering device of the first embodiment with respect to a point that the steering lever 10 is used in place of the steering wheel 1, a point that in addition to the tire reactive force sensor 4, another type sensor 7 such as a vehicle-speed sensor which detects a travelling speed of a vehicle, a torque sensor which detects torque acting on a drive shaft of the vehicle, an acceleration sensor which detects operation acceleration of the steering operation element, a temperature sensor which detects an ambient temperature or an image pick-up sensor which detects a condition of a road surface is provided, a point that a plurality of functions $F_1=f(b+b')$, $F_2=f(b+b')$, $F_3=f(b+b')$ using a detection signal b inputted from a tire reactive force sensor 4 and a detection signal b' inputted from the above-mentioned other type sensor 7 as parameters are preliminarily stored in a controller 6, and the controller 6 computes a drive signal c' of an operating element actuator 3 and thereafter outputs the drive signal c'.

Figure 4:
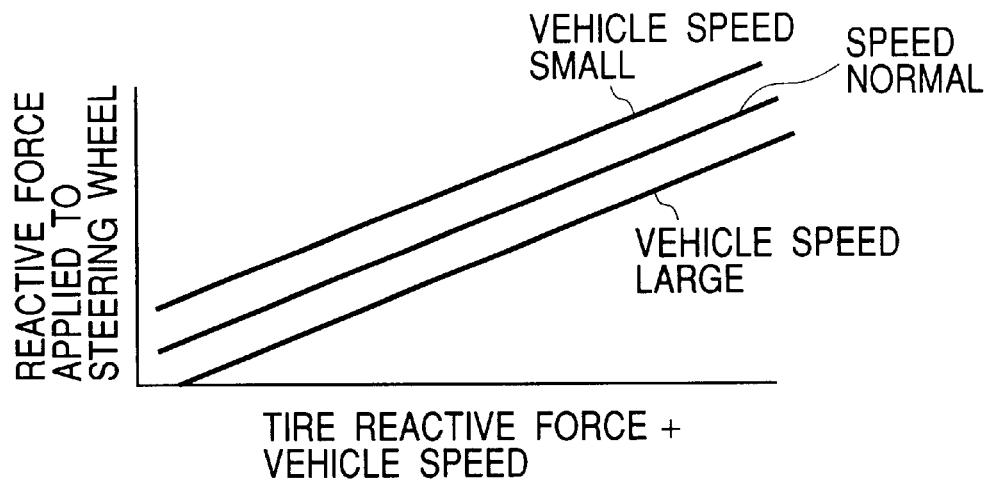
FIG. 4 is a graph showing the relationship among an external force which acts on a steering operation element of the steering device, a reactive force of a tire and a vehicle speed according to the second embodiment.

FIG. 4 is a graph showing a control method by the controller 6 when the vehicle speed sensor is used together with the tire reactive force sensor 4 as the detection means for detecting the travelling condition of the vehicle. There exists a phenomenon that as the vehicle speed is greater, an external force which acts on the steering lever 10 is increased and the travelling of the vehicle becomes unstable. To prevent such a phenomenon, in this case, when the vehicle speed becomes equal to or more than a first prescribed value, that is, when the vehicle speed in increased, an output of the operating element actuator 3 is decreased so as to suppress the external force applied to the steering lever 10. Further, there also exists a phenomenon that as the vehicle speed is smaller, the external force applied to the steering lever 10 is decreased so that the careless operation of the steering lever 10 may arise. To prevent such a phenomenon, in this case, when the vehicle speed is equal to or below a second prescribed value, that is, when the vehicle speed is small, an output of the operating element actuator 3 is increased so as to reinforce the external force applied to the steering lever 10.

Figure 5:
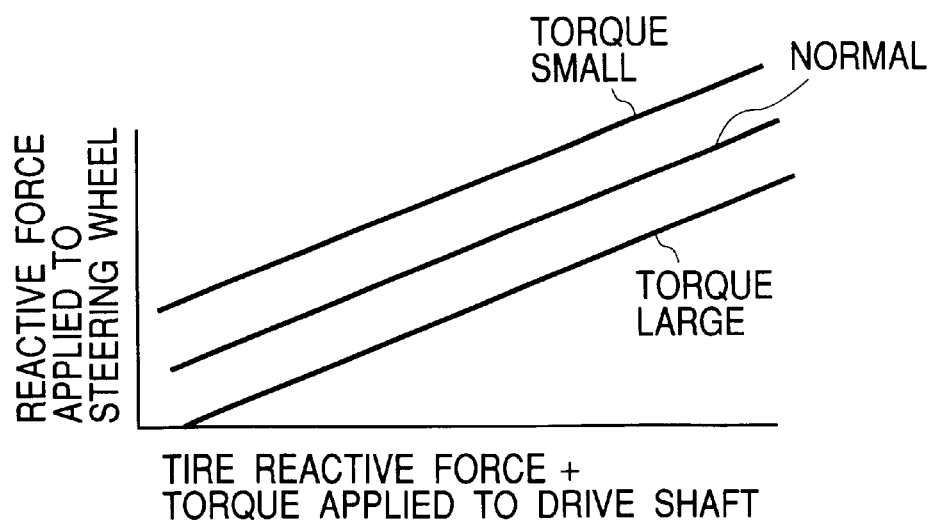
FIG. 5 is a graph showing the relationship between the external force which acts on the steering operation element of the steering device and a torque which acts on a drive shaft of a vehicle according to the second embodiment.

FIG. 5 is a graph showing a control method by the controller 6 when the torque sensor is used together with the tire reactive force sensor 4 as the detection means for detecting the travelling condition of the vehicle. There exists a phenomenon that as the torque which acts more on a drive shaft of a vehicle, an external force which acts on the steering lever 10 is increased so that the posture of the vehicle when a steering wheel is sharply operated becomes unstable. To prevent such a phenomenon, in this case, when the torque which acts on the drive shaft becomes equal to,or more than a first prescribed value, that is, when the torque is large, the output of the operating element actuator 3 is decreased so as to suppress an external force applied to the steering lever 10. Further, there also exists a phenomenon that as the torque acts less on the drive shaft, the external force applied to the steering lever 10 is decreased and a careless operation of the steering lever 10 may arise. To prevent such a phenomenon, in this case, when the torque which acts on the drive shaft is equal to or below a second prescribed value, that is, when the torque is small, the output of the operating element actuator 3 is increased so as to reinforce the external force applied to the steering lever 10.

Figure 6:
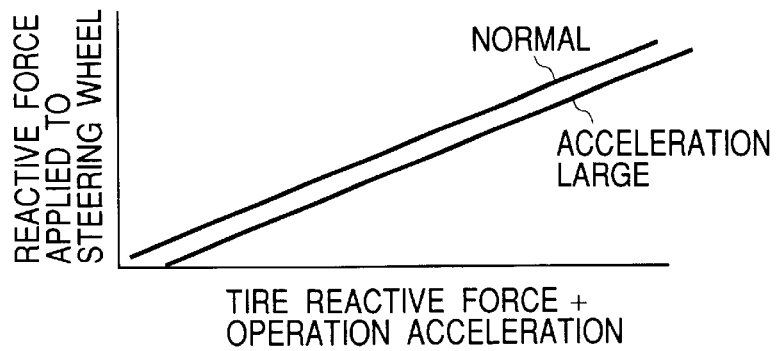
FIG. 6 is a graph showing the relationship among the external force which acts on the steering operation element of the steering device, a reactive force of a tire and an external force which acts on the tire of a vehicle according to the second embodiment.

FIG. 6 is a graph showing a control method by the controller 6 when the acceleration sensor which detects the operation acceleration of the steering operation element is used together with the tire reactive force sensor 4 as the detection means for detecting the travelling condition of the vehicle. There exists a phenomenon that as the operation acceleration of the steering lever 10 is greater, that is, corresponding to the increase of the sharpness of the steering wheel operation, an external force which acts on the steering lever 10 is increased so that the posture of the vehicle becomes unstable. To prevent such a phenomenon, when the operation acceleration of the steering lever 10 is equal to or more than a prescribed value, that is, when the acceleration is large, the output of the operating element actuator 3 is decreased so as to suppress an external force applied to the steering lever 10.

Figure 7:
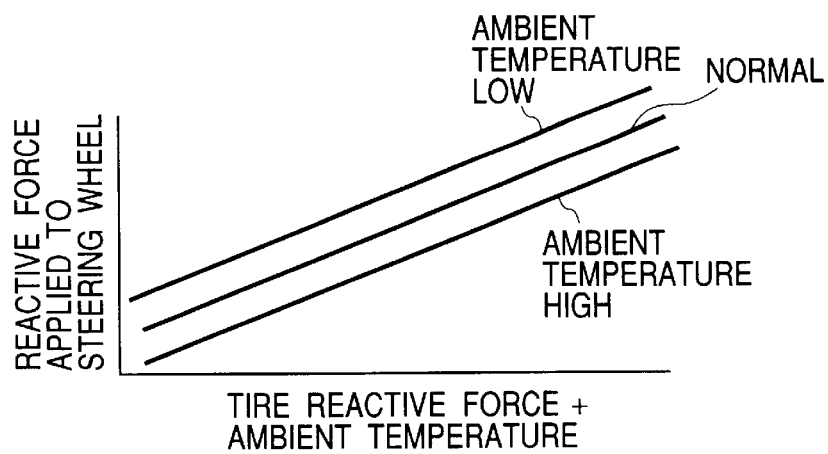
FIG. 7 is a graph showing the relationship among the external force which acts on the steering operation element of the steering device, a reactive force of a tire and an ambient temperature according to the second embodiment.

FIG. 7 is a graph showing a control method by the controller 6 when the temperature sensor is used together with the tire reactive force sensor 4 as the detection means for detecting the travelling condition of the vehicle. There exists a phenomenon that corresponding to the lowering of an ambient temperature or a road surface temperature, the tire is hardened and hence, a gripping force of the road surface is reduced and an external force which acts on the steering lever 10 is decreased whereby the travelling of the vehicle becomes unstable. To prevent such a phenomenon, when the ambient temperature or the road surface temperature becomes equal to or below a first prescribed value, that is, when the ambient temperature is lowered, the output of the operating element actuator 3 is increased so as to reinforce the external force applied to the steering lever 10. On the other hand, there exists a phenomenon that corresponding to the elevation of the ambient temperature or the road surface temperature, the external force applied to the steering lever 10 is increased so that the operation performance of the vehicle is worsened. To prevent such a phenomenon, when the ambient temperature or the road surface temperature becomes equal to or more than a second prescribed value, that is, when the ambient temperature is high, the output of the operating element actuator 3 is decreased so as to attenuate the external force applied to the steering lever 10.

Figure 8:
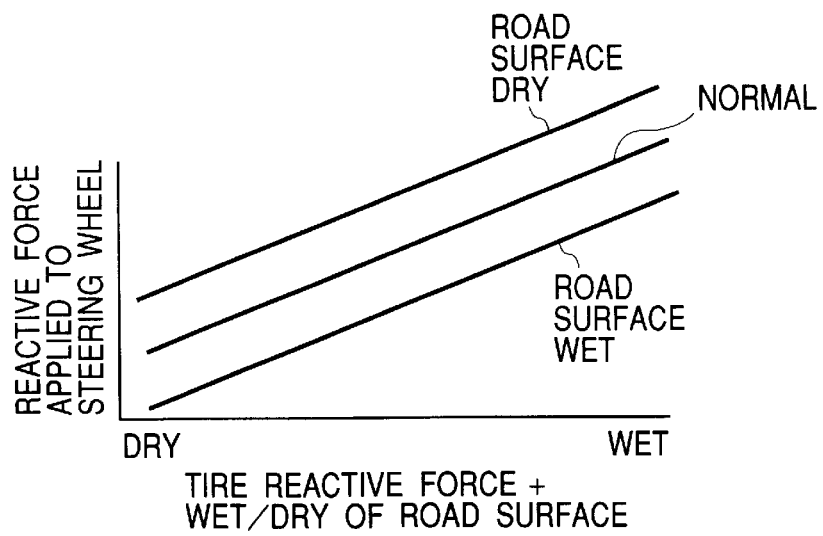
FIG. 8 is a graph showing the relationship among the external force which acts on the steering operation element of the steering device, a reactive force of a tire and a wet condition of a road surface according to the second embodiment.

FIG. 8 is a graph showing a control method by the controller 6 when the image pick-up sensor is used together with the tire reactive force sensor 4 as the detection means for detecting the travelling condition of the vehicle. There exists a phenomenon that when a road surface is wet, a gripping force of a tire is decreased so that an external force which is applied to the steering lever 10 is decreased whereby the travelling of a vehicle becomes unstable. To prevent such a phenomenon, when the road surface is wet, the output of the operating element actuator 3 is increased so as to reinforce the external force applied to the steering lever 10. On the other hand, there exists a phenomenon that when the road surface is dry, the gripping force of the tire is increased so that a steering wheel can be operated sharply whereby the posture of the vehicle becomes suddenly changed adversely even when the operation angle of the steering lever 10 is fixed thus making the travelling of the vehicle unstable. To prevent such a phenomenon, when the road surface is dry, the output of the operating element actuator 3 is decreased so as to attenuate the external force applied to the steering lever 10.

In this manner, according to the steer-by-wire steering device according to the above-mentioned respective embodiments, it is possible to apply the optimum external force corresponding to the travelling condition of the vehicle or the road condition to the steering operation elements 1, 10 so that the operation performance and the reliability of the steer-by-wire steering device can be enhanced.

As has been explained heretofore, according to the present invention, a plurality of functions which use the detection signal inputted to the controller from the detection means as the parameter are preliminarily stored, an optimum function is selected from the plurality of preliminarily stored functions by the controller in response to the level of the detection signal inputted from the detection means, the control signal for the actuator is computed and outputted by the controller based on the selected function and the level of the inputted detection signal. Accordingly, it is possible to apply an optimum external force to the steering operation element in response to the travelling condition of the vehicle or the road surface condition whereby the operation performance and the reliability of the steer-by-wire steering device can be enhanced.

What is claimed is:

1. A steer-by-wire steering device comprising:
   a steering operation element;
   an actuator which applies an external force to the steering operation element;
   a controller of the actuators; and
   at least a tire reactive force sensor which detects an external force applied to a tire of the vehicle from a road surface,
   wherein when a level of a detection signal detected by the tire reactive force sensor is small, reinforced external force is applied to the steering operation element by the actuator, and when the level of the detection signal detected by the tire reactive force sensor is large, attenuated external force is applied to the steering operation element by the actuator.

2. A steer-by-wire steering comprising:
   a steering operation element;
   an actuator which applies an external force to the steering operation element;
   a controller of the actuator; and
   a detector to detect a traveling condition of a vehicle including at least a tire reactive force sensor which detects an external force applied to a tire of the vehicle from a road surface,
   wherein the controller stores a plurality of functions which use a detection signal inputted from the detector as a parameter therein,
   the controller selects an optimum function from the plurality of functions in response to a level of the detection signal inputted from the detector,
   the controller computes a control signal for the actuator based on the selected function and the level of the detection signal and outputs the control signal, and
   as the detector, in addition to the tire reactive force sensor, the steering device is further provided with at least one type of sensor selected from a group of sensors including a vehicle speed sensor which detects a travelling speed of the vehicle, a torque sensor which detects torque acting on a drive shaft of the vehicle, an acceleration sensor which detects operation acceleration of the steering operation element, a temperature sensor which detects an ambient temperature, and an image pick-up sensor which detects a road surface condition.

3. A steer-by-wire steering device according to claim 2, wherein, provided that the image pick-up sensor which detects the road surface condition is provided as the detector, the function which is selected by the image pick-up sensor when the road surface is wet is a function which sets the external force applied to the steering operation element to an external force larger than an external force proportional to the level of the detection signal, and wherein the function which is selected by the image pick-up sensor when the road surface is dry is a function which sets the external force applied to the steering operation element to an external force smaller than the external force proportional to the level of the detection signal.

4. A steer-by-wire steering device according to claim 2, wherein, provided that the acceleration sensor which detects operation acceleration of the steering operation element is provided as the detector, the function which is selected when the operation acceleration detected by the acceleration sensor is at least a prescribed acceleration is a function which sets the external force applied to the steering operation element to an external force smaller than an external force proportional to the level of the detection signal.

5. A steer-by-wire steering device comprising:

a steering operation element;

an actuator which applies an external force to the steering operation element;

a controller of the actuator; and a detector to detect a traveling condition of a vehicle including at least a tire reactive force sensor which detects an external force applied to a tire of the vehicle from a road surface, wherein the controller stores a plurality of functions which use a detection signal inputted from the detector as a parameter therein, the controller selects an optimum function from the plurality of functions in response to a level of the detection signal inputted from the detector, the controller computes a control signal for the actuator based on the selected function and the level of the detection signal and outputs the control signal, and the function which is selected when the level of the detection signal is at most a first prescribed value is a function which sets the external force applied to the steering operation element to an external force smaller than an external force proportional to the level of the detection signal, wherein the function which is selected when the level of the detection signal is at least a second prescribed value is a function which sets the external force applied to the steering operation element to an external force larger than the external force proportional to the level of the detection signal, and wherein the function which is selected when the level of the detection signal is above the first prescribed value and is below the second prescribed value is a function which sets the external force applied to the steering operation element to the external force proportional to the level of the detection signal.

6. A steer-by-wire steering device comprising:

a steering operation element;

an actuator which applies an external force to the steering operation element;

a controller of the actuator; and a detector to detect a traveling condition of a vehicle including at least a tire reactive force sensor which detects an external force applied to a tire of the vehicle from a road surface, wherein the controller stores a plurality of functions which use a detection signal inputted from the detector as a parameter therein, the controller selects an optimum function from the plurality of functions in response to a level of the detection signal inputted from the detector, the controller computes a control signal for the actuator based on the selected function and the level of the detection signal and outputs the control signal, and the function which is selected when the level of the detection signal is at most a first prescribed value is a function which sets the external force applied to the steering operation element to an external force larger than an external force proportional to the level of the detection signal, wherein the function which is selected when the level of the detection signal is at least a second prescribed value is a function which sets the external force applied to the steering operation element to an external force smaller than the external force proportional to the level of the detection signal, and wherein the function which is selected when the level of the detection signal is above the first prescribed value and is below the second prescribed value is a function which sets the external force applied to the steering operation element to the external force proportional to the level of the detection signal.

* * * * *